United States Patent Office 3,351,813
Patented Nov. 7, 1967

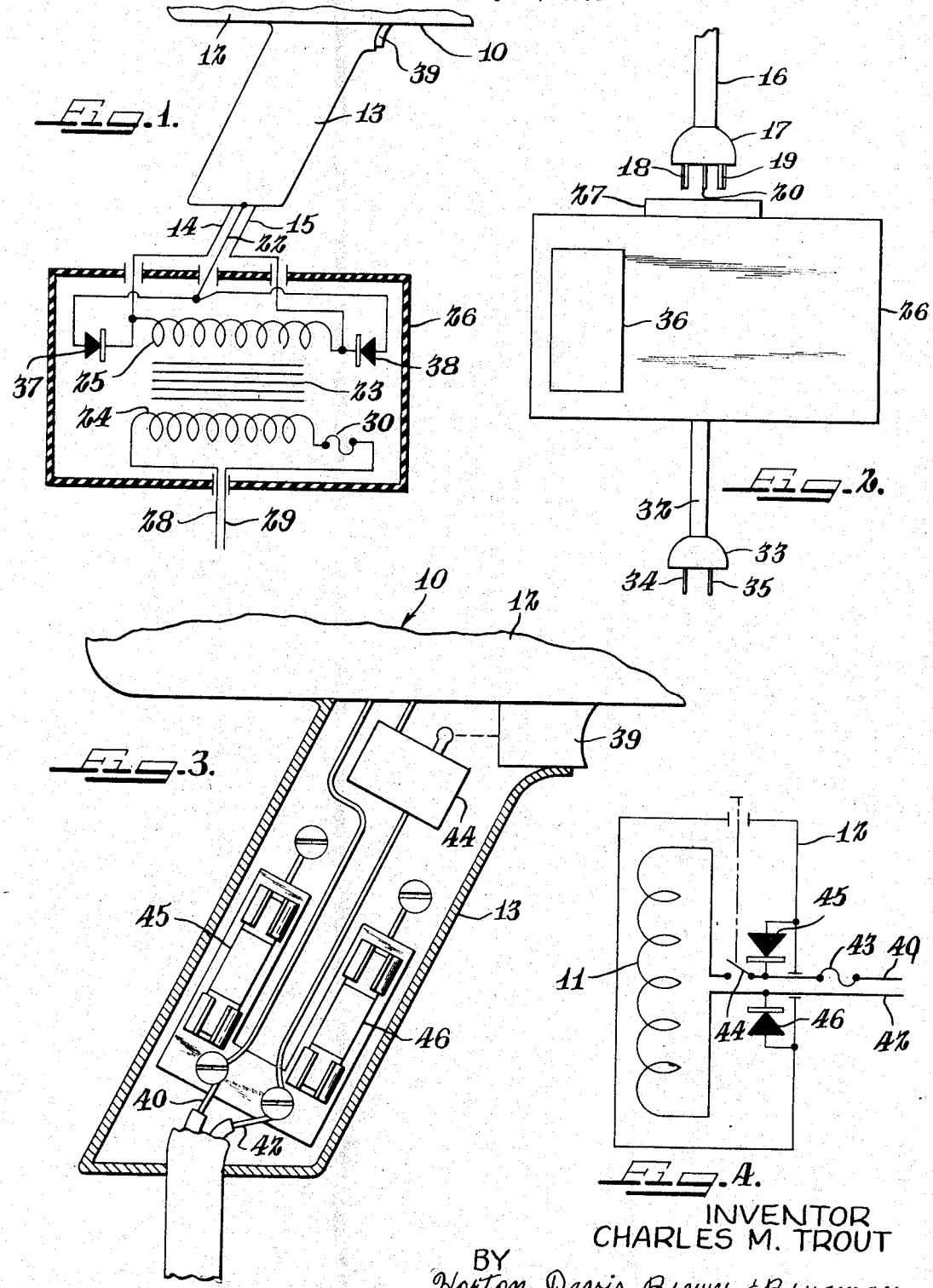

3,351,813
SAFETY CIRCUIT FOR ELECTRICAL APPARATUS
Charles M. Trout, 7120 N. Sheridan Road,
Chicago, Ill. 60626
Filed July 16, 1965, Ser. No. 472,420
9 Claims. (Cl. 317—18)

ABSTRACT OF THE DISCLOSURE

A safety circuit for electrical apparatus, including electrically driven tools, appliances and other devices used as voltages sufficiently high to produce a shock and which have some exposed conductive part which is apt to be touched by a user during operation; said safety circuit embodying semi-conductors in a manner such that they are normally inoperative, but in which at least one becomes effective to cause opening of a current limiting device in the event of the occurrence of an abnormal condition which might otherwise subject a user of the electrical apparatus to shock through contact with said conductive part.

---

This invention relates to safety circuits for electrical apparatus, and more particularly to such circuits adapted to use in electrical apparatus, such as electrically driven tools, electrical appliances and other electrical devices which have an electrically conductive and normally ungrounded part, such as a housing, outer casing, base or operating handle or grip which is normally not a part of the electrical circuit of the appliance and which is subject to being touched or gripped by a user of the appliance during use.

Some appliances and tools are provided with an extra conductor in the plug-in cord or as an extra wire for grounding the metal housing, casing or other conductive part which may be touched by a user. Such a ground wire, if properly used, establishes the ground potential of the part to which it is connected and minimizes the likelihood of a person being shocked by contact therewith. However, since most outlet fixtures now in common use do not have a ground terminal, since ground connections are often not available, and since most temporary wiring used during construction work does not include provision for a ground connection, the ground wires are generally considered to be too troublesome for use. Chances are taken by using the electrical apparatus without a ground lead, and shocks and injuries result.

One of the objects of this invention is to provide a safety circuit for electrical apparatus which eliminates the necessity for the provision of a ground connection to a part of the apparatus in order to provide reasonable assurance against shock to a user in the event that a fault develops in the apparatus.

As another object, this invention comprehends the provision of electrical apparatus having semi-conductor devices associated therewith which are normally ineffective in conjunction with the operation of the apparatus, but which serve to detect faults and cause the circuit to the apparatus to be disrupted by a current limiting device.

This invention has for another object the provision of a safety circuit for electrical apparatus which is connected to detect a fault which may develop in the apparatus whether or not the apparatus is in use at the time the fault develops.

Another object of this invention is to provide a safety circuit for electrical apparatus which isolates the appliance and its circuit and components from ground, so that the safety circuit is effective for its intended purposes, even when one side of the main power circuit is grounded and the user of the appliance may have a contact with ground or a grounded conductor.

Other objects and advantages of the invention will be apparent from the following description and the accompanying drawings in which similar characters of reference indicate similar parts throughout the several views:

FIG. 1 is a schematic diagram showing the adaptation of a preferred embodiment of this invention to the operation of electrical apparatus which, in this instance, comprises a power tool which is fragmentarily illustrated;

FIG. 2 is a top elevational view of a portion of the apparatus which is shown diagrammatically in FIG. 1;

FIG. 3 is a fragmnetary view, partially in section and illustrating the adaptation of a modified form of my invention in an application to electrical apparatus which, in the present instance, comprises a power tool; and FIG. 4 is a schematic circuit diagram of the apparatus depicted in FIG. 3.

In the exemplary embodiment of this invention which is depicted in the accompanying drawings for illustrative purposes, electrical apparatus 10 is shown as a power tool which has an electrically conductive housing 12 including a hand grip portion 13. The housing 12 is normally insulated from the energy translating portion of the apparatus. Operating current is supplied to the energy translating portion of the apparatus through power supply line leads 14 and 15. As shown in FIG. 2, the power supply line leads 14 and 15 are embodied in an insulated power cord 16 having thereon a plug 17, which plug has terminals 18 and 19 connected to the power supply line leads 14 and 15. The plug 17 also has a third terminal 20 which is connected through a lead 22 to the conductive housing 12 of the electrical apparatus.

In the invention, as depicted in FIGS. 1 and 2, an isolation transformer 23 is utilized. This transformer has a primary winding 24 and a secondary winding 25, which windings are separate and insulated from one another. The ratio of the transformer is 1 to 1, and its purpose is to isolate the primary and secondary circuits and to eliminate any direct connection of the secondary circuit to ground. For use as disclosed herein, the transformer 23 has an insulating housing 26 which, being nonconductive, affords no possibility of a user being shocked by contact therewith. A socket 27 is mounted on the housing 26 for making connections to the terminals 18, 19 and 20 of the plug 17.

The primary winding 24 of the transformer 26 is connected to power supply line leads 28 and 29 through a current limiting device 30, such as a fuse. As shown in FIG. 2 the power supply line leads 28 and 29 are included in an insulated cable 32 having a plug 33 thereon which includes terminals 34 and 35, which terminals are connected to the power supply line leads 28 and 29. The current limiting device 30 is mounted in the transformer housing 26 and is desirably accessible for change through a door 36.

Through the socket 26, the secondary winding 25 of the transformer 23 is connected to power supply line leads 14 and 15. In addition, semi-conductor devices 37 and 38 are connected in series across the secondary winding 25 with each such device being connected to be nonconductive with respect to current flow from the secondary winding. The center tap between the series connected semi-conductor devices is connected through the lead 22 to the housing 12 of the electrical apparatus 10.

With the parts thus connected, the primary winding 24 of the transformer is adapted to be connected to a source of electrical energy through the power supply line leads 28 and 29. Through the transformer 23, power is supplied to the electrical apparatus 10. The transformer isolates the electrical apparatus from any connection to ground. The electrical apparatus 10 includes a switch operated by means such as a trigger 38 which controls the operation of the apparatus. If, for any reason, one of the power supply line leads 14 or 15, or if the energy translating portion of the electrical apparatus 10 makes contact with the conductive housing 12 of the apparatus, one or both of the semi-conductor devices 37 and 38 will become conductive to create an overload current which will be sufficient to cause the current limiting device 30 to break the circuit to the primary winding. Thus, the circuit acts to detect the abnormal current flow and to protect the user of the apparatus from a shock of appreciable continuing duration.

In FIGS. 3 and 4, the safety circuit is shown in an adaptation which eliminates the isolation transformer 23, and which safety circuit is adapted to use in instances in which neither side of the power supply line is grounded and in which the user is not apt to make contact with ground during the use of the electrical apparatus. In this embodiment of the invention, the electrical apparatus 10 includes an energy translating device 11 and has a conductive housing 12. The energy translating device 11 is connected to power supply line leads 40 and 42 through a current limiting device 43 and a switch 44. On the power supply line side of the switch 44, semi-conductor devices 45 and 46 are connected to the power supply line leads 40 and 42 and to the conductive housing 12. Each semi-conductor device is connected to be nonconductive of current flowing from the power supply line leads to the conductive housing.

If either of the power supply line leads 40 or 42 or if a part of the energy translating device 11 makes contact with the conductive housing 12, one or both of the semi-conductor devices 45 or 46 will become conductive to cause an abnormal current flow through the current limiting device 43, which current limiting device will open the circuit to the power supply line leads and thereby prevent a continuing abnormal current flow to or through the electrical apparatus and its housing.

In both modifications of the disclosed invention, it may be readily understood that the peak inverse voltage ratings of the semi-conductor devices considerably exceeds the peak line voltage at which the apparatus is subject to use. The semi-conductor devices should also have a maximum surge current rating which is much higher than the current required to open the circuit through the current limiting device used in the circuit. The current limiting device must also, of course, have a rating sufficient to carry the normal operating currents encountered in the use of the apparatus.

From the foregoing description and by reference to the accompanying drawings, it may be understood that by this invention I have provided safety circuits for electrical apparatus in which normally inoperative semi-conductor devices become active in the event of an abnormal condition to detect the abnormal condition and effect the breaking of the electrical circuit to the apparatus, thereby preventing a continuing shock to the user of the apparatus.

It is thus understood that the foregoing description is merely illustrative of further embodiments of this invention and that the scope of this invention is not to be limited thereto, but is to be determined by the appended claims.

I claim:

1. A safety circuit for use with electrical apparatus in which normally insulated power supply leads supply operating current from a power source through a current limiting device to a power translating device having an electrically conductive and normally ungrounded housing, and comprising, in combination, an electrically conductive and normally ungrounded housing element, a power translating device insulatingly mounted on said housing element and having terminal means thereon for the supply of operating current thereto, a plurality of normally insulated power supply line leads connected to said terminal means for conducting said operating current to the power translating device, semi-conductor devices each connected to one of said power supply line leads and to said housing element so as to be normally conductive in a direction from the housing element to the one of the power supply line leads to which it is connected, whereby an abnormal condition providing a flow of current from any one power supply line lead to said housing element will cause an abnormal current flow through the semi-conductor connected to another power supply lead than said one to disrupt the circuit at said current limiting device.

2. A safety circuit as defined in claim 1, and further characterized by a switch connected in series with one of said power supply line leads, and said semi-conductor being connected to the power supply line lead side of said switch.

3. A safety circuit for use with an electrical power source including current limiting means for opening the circuit to said power source when the current flow therefrom exceeds a predetermined value, and comprising, in combination, a power translating device having an electrically conductive and normally ungrounded part normally insulated from the power translating device and subject to being touched by a user of the translating device, a plurality of power supply line leads through which said power translating device is connected to the power source through said current limiting means, semi-conductor devices each having terminals connected to one of said power supply line leads and to said part and having current conductive capacities greater than said predetermined value, and each of said semi-conductor devices being connected for the normal conduction of current from said part to the conductor to which it is connected.

4. A safety circuit as defined in claim 3, and further characterized by a switch connected in series with one of said power supply line leads at a position between said semi-conductor device and said power translating device.

5. In a safety circuit for electrical apparatus having power supply line leads and a conductive and normally ungrounded part exposed for engagement by a user of the apparatus, the combination comprising semi-conductor devices each having a terminal connected to one of said power supply line leads and another terminal connected to said part, said semi-conductor devices each being connected normally to block current flow from the power supply line leads to said part, and an isolation transformer having primary and secondary windings insulated from one another, said secondary winding being connected to said power supply line leads, and said primary winding having a current limiting device connected in series therewith.

6. A safety circuit for use with an electrical power source including current limiting means for opening the circuit to said power source when the current flow therefrom exceeds a predetermined value, and comprising, in combination, a power translating device having an electrically conductive and normally ungrounded part normally insulated from the power translating device and subject to being touched by a user of the power translating device, conductive lead wires including a pair of power supply leads connected to the power translating device and normally insulated from said part and a third lead connected to said part, a transformer having separate primary and secondary windings, said pair of power supply leads being connected to said secondary, semi-conductor devices each having a terminal connected to one of the power supply leads of said pair and a second terminal connected to said third lead, each of said semi-conductor devices being connected normally to block current flow from said power supply leads to said primary winding to said electrical power source.

7. For use with a power tool having a conductive housing and a power translating device normally insulated from the housing, the combination comprising a transformer having separate primary and secondary windings and an insulating enclosure, means for connecting the primary winding of the transformer to a power source through a current limiting device, a three terminal outlet socket for said transformer, two of said terminals being connected to the opposite ends of said secondary winding, and two semi-conductor devices each having a terminal connected to an end of said secondary winding and another terminal connected to the third terminal of said outlet socket, said semi-conductor devices each being connected normally to block current flow from said secondary winding to said third terminal of the outlet socket.

8. The combination as defined in claim 7, and further characterized by a current limiting device mounted in said insulating enclosure for the transformer and connected in series with said primary winding.

9. A safety device for use with power tools and the like having a conductive housing and a three conductor power cable including two power wires and a third wire connected to said conductive housing and comprising, in combination, a transformer having separate primary and secondary windings, a current limiting device connected in series with said primary winding, and semi-conductor devices connected to opposite ends of said secondary winding and to a common terminal adapted to be connected to said third wire, said semi-conductor devices being connected normally to block current flow from said secondary winding to said common terminal.

References Cited

UNITED STATES PATENTS

| | | | |
|---|---|---|---|
| 2,649,522 | 8/1953 | Marcus | 339—154 X |
| 2,792,557 | 5/1957 | Dowick | 339—14 |
| 3,072,827 | 1/1963 | Benish | 317—18 |
| 3,168,682 | 2/1965 | Moore et al. | 317—18 |
| 3,255,383 | 6/1966 | Astleford | 317—15 |

MILTON O. HIRSHFIELD, *Primary Examiner.*

J. D. TRAMMELL, *Assistant Examiner.*